(12) United States Patent
Akamoto et al.

(10) Patent No.: US 10,352,461 B2
(45) Date of Patent: Jul. 16, 2019

(54) VALVE DEVICE HAVING A ROTATING SUPPORT MEMBER FOR CONVERTING ROTATIONAL DISPLACEMENT INTO LINEAR DISPLACEMENT OF A VALVE

(71) Applicant: Fujikin Incorporated, Osaka-shi (JP)

(72) Inventors: Hisatoshi Akamoto, Osaka (JP); Yuya Suzuki, Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 15/562,056

(22) PCT Filed: Mar. 23, 2016

(86) PCT No.: PCT/JP2016/059109
§ 371 (c)(1),
(2) Date: Sep. 27, 2017

(87) PCT Pub. No.: WO2016/158598
PCT Pub. Date: Oct. 6, 2016

(65) Prior Publication Data
US 2018/0087677 A1    Mar. 29, 2018

(30) Foreign Application Priority Data

Mar. 30, 2015  (JP) ................................. 2015-070056

(51) Int. Cl.
*F16K 7/16* (2006.01)
*F16K 25/00* (2006.01)
(Continued)

(52) U.S. Cl.
CPC .............. *F16K 7/16* (2013.01); *F16K 25/005* (2013.01); *F16K 31/508* (2013.01); *F16K 31/5288* (2013.01); *F16K 35/02* (2013.01)

(58) Field of Classification Search
CPC ... F16K 7/16; F16K 7/14; F16K 7/123; F16K 31/508; F16K 25/005; F16K 31/5288; F16K 35/02
See application file for complete search history.

(56) References Cited

U.S. PATENT DOCUMENTS

| 4,928,919 A | 5/1990 | Daicho et al. |
| 8,104,742 B2 | 1/2012 | Ishihara et al. |

(Continued)

FOREIGN PATENT DOCUMENTS

| JP | 2113188 A | 4/1990 |
| JP | 1061807 A | 3/1998 |

(Continued)

*Primary Examiner* — Marina A Tietjen
(74) *Attorney, Agent, or Firm* — The Webb Law Firm (57) ABSTRACT

A valve device which improves the operability of a valve for opening and closing a flow path. The valve device includes a valve, an actuator, an actuator support member, an operating portion, and a threaded member wherein the valve is able to open and close a fluid path in a valve body having a fluid inflow passage and a fluid outflow passage. The actuator displaces the valve between an open position and a closed position. The actuator support member operatively supports the actuator so that the actuator is able to be driven. The operating portion drives the actuator. The threaded member is threadedly engaged with the actuator.

11 Claims, 5 Drawing Sheets

(51) Int. Cl.
  *F16K 31/50* (2006.01)
  *F16K 31/528* (2006.01)
  *F16K 35/02* (2006.01)

(56) References Cited

U.S. PATENT DOCUMENTS

9,803,776 B2  10/2017  Akamoto et al.
2014/0103240 A1* 4/2014 Glime, III ............ F16K 31/506
                                                          251/265

FOREIGN PATENT DOCUMENTS

| JP | 2001146977 A  | 5/2001  |
|----|---------------|---------|
| JP | 2011220415 A  | 11/2011 |
| JP | 2011247352 A  | 12/2011 |
| JP | 2014211170 A  | 11/2014 |
| WO | 2007063635 A1 | 6/2007  |

* cited by examiner

VALVE DEVICE HAVING A ROTATING SUPPORT MEMBER FOR CONVERTING ROTATIONAL DISPLACEMENT INTO LINEAR DISPLACEMENT OF A VALVE

CROSS-REFERENCE TO RELATED APPLICATIONS

This application is the United States national phase of International Application No. PCT/JP2016/059109 filed Mar. 23, 2016, and claims priority to Japanese Patent Application No. 2015-070056 filed Mar. 30, 2015, the disclosures of which are hereby incorporated in their entirety by reference.

FIELD OF THE INVENTION

The present invention relates to a valve device, and more particularly to a valve device that further improves the operability of a valve body that opens and closes a flow path.

BACKGROUND OF THE INVENTION

Description of Related Art

Patent Reference 1 previously disclosed "a valve device comprising:
a valve member placed in a valve body having an inlet port and an outlet port, the valve member for obstructing the inlet and outlet ports or allowing the inlet and outlet ports to communicate with each other,
a rotating part rotating around a central axis thereof, for driving the valve member so as to place the valve member at an obstructing position or at a communicating position,
a rotating part holder for holding the rotating part in such a way that the rotating part is rotatable, an operating part for rotating the rotating part, and
a tubular member fitted to the rotating part in such a manner that the tubular member is movable along the central axis of the rotating part in both directions;
wherein the tubular member has first protrusion formed on an inner circumferential face of the tubular member along a central axis of the tubular member, and the first protrusion engages with or disengages from first recesses formed in an outer circumferential face of the rotating part holder along a central axis of the rotating part holder when the tubular member moves in either direction; or the tubular member has second recesses formed in the inner circumferential face of the tubular member along the central axis thereof, and the second recesses engage with or disengage from a second protrusion formed on the outer circumferential face of the rotating part holder along the central axis thereof when the tubular member moves in either direction (See the claims of Patent Reference 1).

This valve device contains the remarkable technical feature of "when the rotating part 6 including the stem head 14 is in a non-rotatable state in this manner, changes in the pressure of fluid in the flow path and an application of external force that rotates the lever 19 clockwise or counterclockwise to the lever 19 are not able to rotate the rotating part 6. As a result, the position of the valve member 5 is kept unchanged and the partly communicating state created by the valve member 5 is maintained" (See Paragraph 0066 of Patent Reference 1).

However, not only in the valve device disclosed in Patent Document 1 but also for valve devices in general a desirable feature of a valve is when the valve reliably shuts off the flow even if there is a sudden increase in the fluid pressure.

Patent Document 2 discloses a built-in damper valve device. The built-in damper device describes that "the valve body 2 is pushed by the biasing force member 3 and moves in the valve closing direction (to the right in the drawing), and the closing face portion 2e is seated on the valve seat 1e to block backflow, but at this time, the closing face portion 2e of the valve body 2 is gradually seated on the valve seat 1e without impact noise, vibration, abnormal pressure rise or the like due to the braking action of the damper chamber k to prevent water hammer (See Paragraph 0013 of Patent Reference 2)" which indicates that the biasing force member acts to prevent water hammer.

Patent Reference 3 discloses a fluid controlling device. In this fluid controller, "The bonnet is comprised of a main body and an adapter disposed underneath the main body, an outer edge portion of the diaphragm is sandwiched between the valve body and the adapter with a disc spring interposed between the main body and the adapter" (see claim 2 of Patent Document 3), "The disc spring (9) prevents stress relaxation due to cold flow of diaphragm (8) and has the role of appropriately adjusting the clamping pressure of the diaphragm (8) by the adapter (32) and the valve body (1)" (See paragraph number 0022 of Patent Document 3).

PRIOR ART REFERENCES

Patent References

[Patent Reference 1] Japanese Patent Application Laid-Open No. 2014-111170
[Patent Reference 2] Japanese Patent Application Laid-Open No. H10-61807
[Patent Reference 3] Japanese Patent Application Laid-Open No. 2011-220415

SUMMARY OF THE INVENTION

The problem to be solved by the present invention is to provide a valve device with a valve which is able to open and close a fluid path in a valve body containing a fluid inflow path and a fluid outflow path, an actuator which is able to displace the valve between an open position and a closed position, an actuator support member which is able to operatively support the actuator so that the actuator is able to be rotated, and an operating portion which is able to rotate the actuator and also to provide a valve device which prevents any sudden operation of the operation portion in the event of a sudden rise in the fluid pressure, thereby improving the operability of the operation portion.

Means for solving the aforementioned problem,
Means for solving the aforementioned problem include,
A valve device including a valve, an actuator, an actuator support member, an operating portion, and a threaded member;
  Wherein the valve is able to open and close a fluid path in a valve body having a fluid inflow passage and a fluid outflow passage,
  Wherein the actuator displaces the valve between an open position and a closed position,
  Wherein the actuator support member operatively supports the actuator so that the actuator is able to be driven,
  Wherein the operating portion drives the actuator, and
  Wherein the threaded member is threadedly engaged with the actuator.

The actuator contains a rotating portion that is rotated by the operating portion and a rotating support member that holds the rotating portion and converts the rotational motion of the rotating portion into a linear/back and forth motion of the valve.

The valve includes a diaphragm.

The threaded member is provided with an female thread on an inner peripheral surface thereof and is threadedly engaged with a male thread formed on an outer peripheral surface of the rotating portion, and wherein the threaded member is formed so as to be immovable in the axial direction of the rotating portion.

The actuator is biased by a biasing member in a direction from the open position of the valve to the closed position.

The biasing member is a coil spring.

A disc spring is interposed between the actuator and the valve.

The present invention provides a valve device which is able to prevent the sudden actuation of the actuator because when the actuator is driven, displacing the valve from a closed position to an open position, a frictional force acts on the threaded member and the actuator which necessitates a large exertion force in order to operate the actuator. Because a large exertion force is needed to operate the operating portion and drive the actuator, a minor force, such as when an object inadvertently collides with the operating portion, will not easily displace the operating portion and a valve device preventing sudden actuation of the actuator is provided by the invention. Specifically, in either the case in which the valve is blocking a fluid inflow passage from a fluid outflow passage, or in which the valve is in a state allowing fluid to flow from a fluid inflow passage to a fluid outflow passage, even if there is a sudden surge in the pressure of the fluid in contact with the valve, because a large exertion force is needed to drive the actuator as a result of the frictional force on the threading means between the threaded member and the actuator, the closed state of the valve is not easily broken, thus providing a valve device in which the valve does not abruptly change to a different flow state. Moreover, because the threaded member is screwed into the actuator, even though there may be an accumulation of errors in any part occurring during the assembly of the valve device into a finished product, a valve device which can accurately secure the closed position of the valve body by rotating the threaded member can nonetheless be provided.

In the present invention, the actuator has a rotating portion which is rotated by an operating portion and a rotating portion support member which holds the rotating portion and converts the rotational movement of the rotating portion into a back and forth motion for displacing the valve; moreover, because the threaded member is screwed together with the actuator, a valve device can be provided which smoothly displaces the valve from a closed position to an open position by smoothly converting the rotational motion of the rotating portion into a back and forth motion when the actuator is driven by the actuator operating portion. A valve device that can smoothly convert a rotational motion into the back and forth motion of the valve is considered ideal for operability. In the present invention, "back and forth motion" refers to the linear motion of the valve, wherein when the valve body advances in a straight line from an open position to a closed position the motion can be referred to as either a forward motion or a backward motion and the movement of the valve body as it advances in a straight line from a closed position to an open position can also be referred to as either a backward motion or a forward motion.

Further, if the motion of the valve body is a back and forth motion in the vertical direction, the motion may also be referred to as the vertical motion of the valve body. Regardless of the perspective, the valve body is being linearly displaced via a back and forth motion.

In the present invention, the threaded member is a female thread on an inner peripheral surface that is engaged with a male screw formed on the outer peripheral surface of the rotating portion of the actuator and formed so as to be immovable in the axial direction of the rotating portion; moreover, because a large exertion force is needed to drive the actuator, the valve's position can be smoothly displaced which prevents abrupt actuation of the actuator and, therefore, providing a valve device with improved operability. Also, in addition to improving the operability, rotating the threaded member also compensates for the accumulation of any existing dimensional errors present in the various components forming the valve device because the position of the valve is able to be precisely adjusted; thus, the invention provides a valve device with improved operability and minimizes accidental leakage of a fluid.

In the present invention the actuator is biased by a biasing member such as a coil spring. Because of the biasing member, a minimal force will not easily cause the operating portion to displace the valve from an open position to a closed position or a closed position to an open position. The feature provides a valve device with improved operability because meticulous operation of the valve device is no longer necessary in order to operate the device safely. Moreover, the present invention is able to provide a valve device in which the cutoff state by the valve does not change even if a large fluid pressure is applied to the valve due to an increase in the pressure of the fluid because the actuator maintains the valve position by means of the biasing member which prevents the valve from being displaced from a closed position.

In the present invention the disc spring is interposed between the actuator and the valve. Because of the biasing force imparted by the disc spring, a non-trivial force must be applied to counteract the biasing force in order to operate the operating portion and displace the valve from an open position to a closed position or vice versa. This feature provides a valve device with improved operability because meticulous operation of the valve device is no longer necessary with the result that there is no fear of erroneous operation. Further, according to the present invention, even if there is a large increase in fluid pressure on the valve body due to an increase in the pressure by a fluid, as long as the disc spring is imparting a force on the valve the valve device will not change position and the valve will remain closed.

DETAILED DESCRIPTION OF THE INVENTION

The present invention will be specifically described with reference to the drawings.

Figure 1:
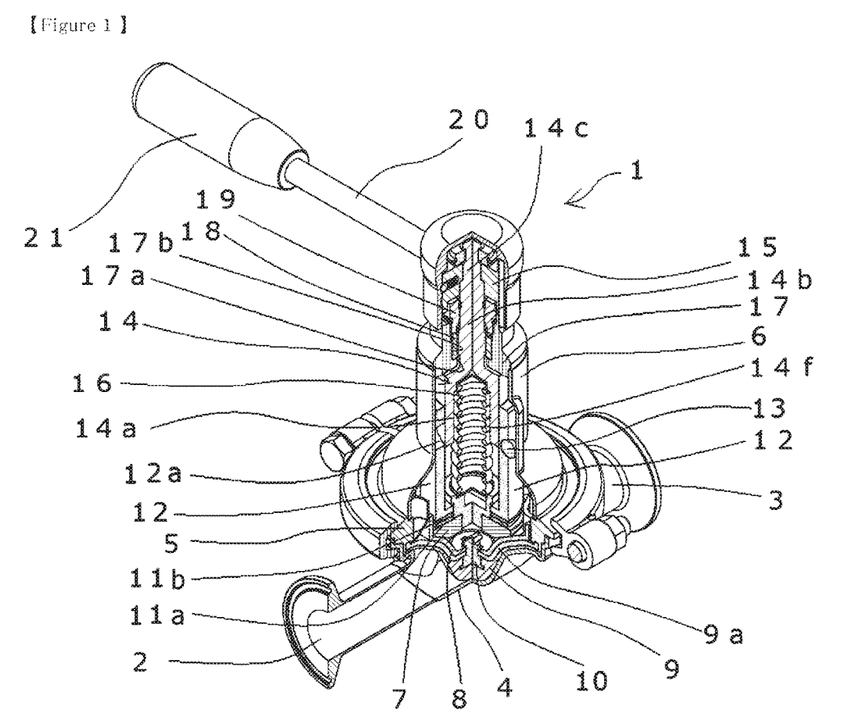
FIG. 1 is a partial cutaway perspective view of an example of the valve device according to the present invention, wherein part of the device is cut away and the resulting section is exposed.

As shown in FIG. 1, valve device 1, which is an example of the present invention, has a valve body 4 with an inlet port 2 and an outlet port 3.

The inlet port 2 and outlet port 3 of the valve body 4 each have a ferrule with the inlet port 2 and ferrule serving as a fluid entrance passage and the outlet port 3 and ferrule serving as a fluid exit passage.

As shown in FIG. 1, the valve device 1 includes an annular support member 5 for mounting a valve device attached to an opening formed on the valve body 4, a cylindrical bonnet case 6 fixedly coupled to the support member 5 and having a larger diameter at the case's lower portion and a smaller diameter for the upper portion as compared with that of the lower portion, and a cylindrical bonnet sleeve 17 secured to the upper portion of the bonnet case 6. Moreover, while in the present invention, in FIG. 1, the position of the bonnet case 6 is adjusted so that the central axis of the bonnet case 6 is in the longitudinal direction, the position of the bonnet case 6 may be adjusted so that the central axis of the bonnet case 6 is oblique with respect to the surrounding environment in which the valve device 1 is disposed.

The bonnet sleeve 17 is fixed to the valve body 4 via the support member 5 and the bonnet case 6; moreover, because the bonnet sleeve 17 also is configured to contain the elements of the actuator, which will be described in detail later, the bonnet sleeve 17 is also an example of the actuator support member. In the present invention, as long as the actuator support member is able to drive the actuator, i.e. the actuator is able to be moved back and forth along the axis thereof, various modifications should be able to be easily devised by a person with skill within the field with regard to the configuration of the actuator support member.

A compressor cover 7, a compressor 8, a diaphragm 9, and a backup elastic membrane 9a are mounted in the inner, lower portion of the bonnet case 6.

The diaphragm 9 is an example of the valve in the present invention. The valve in the present invention is not limited to a diaphragm so long as the valve is able to block or connect the inlet port and the outlet port of the valve body. A person skilled in the field should be able to easily devise various modifications to the configuration of and materials used to make the valve in the present invention.

The compressor cover 7 is formed into a substantially frustoconical shape with an opening through the center and having an outer peripheral surface with a frustoconical shape. By arranging the frustoconically shaped compressor cover 7 in such a manner that the base with the larger circumference is the upper surface, another component is able to be arranged or mounted on the upper surface of the compressor cover.

The compressor 8 is formed into a substantially frustoconical shape having an opening through the center. The compressor 8 is disposed inside the bonnet case 6 so as to be located in the lower part within the bonnet case 6; moreover, the compressor cover 7 is arranged so as to act as a cover with the larger diameter base facing upward and the conical circumferential side surface of the truncated cone shape faces downward. The compressor 8 can be either directly or indirectly fixedly coupled to the annular support member 5.

This compressor 8 has an opening provided at the center portion thereof, and a joint 10 inserted through the opening in a manner such that the joint 10 will not pass through the opening.

The joint 10 integrally connects the diaphragm 9 which acts as the valve in the present embodiment, the compressor 8, and the backup elastic membrane 9a. Specifically, the diaphragm 9 is superimposed on the backup elastic membrane 9a, and both the diaphragm 9 and the backup elastic membrane 9a are substantially circular as viewed from the planar direction and have a convex shape. The central portions of the overlapped diaphragm 9 and the backup elastic membrane 9a as well as the central portion of the compressor 8 are integrally joined by the joint 10. The peripheral edge portions of the diaphragm 9 and the backup elastic membrane 9a are fixedly coupled to the support member 5.

The diaphragm 9 can be made of an elastic material with excellent flexibility, corrosion resistance and heat resistance. Synthetic resins such as polytetrafluoroethylene resin (PTFE), polychlorotrifluoroethylene resin (PCTFE), and tetrafluoroethylene-perfluoroalkylvinyl ether copolymer resin (PFA) are suitably employed as the elastic material.

Moreover, natural rubber, nitrile rubber, styrene rubber, butadiene/isobutylene synthetic rubber, polychloroprene rubber, butyl rubber, silicone rubber, polyurethane rubber, fluororubber (FPM), ethylene propylene rubber (EPDM) and the like can also be preferable examples.

When the compressor 8 moves along the axial direction, the central portion of the diaphragm 9 moves back and forth in the axial direction effectuating either a cutoff state in which the diaphragm 9 makes it impossible for the fluid to flow in the pipe body or a circulation state in which a fluid able to circulate. The position of the diaphragm 9 when the cutoff state is realized occurs when the diaphragm 9 is the closed position and the position of the diaphragm 9 when the flow state is realized occurs when the diaphragm 9 is the open position.

An adapter 12 is disposed above the compressor cover 7 via a pair of annular disc springs 11a and 11b. In the present embodiment of the invention, the pair of disc springs 11a, 11b are disc springs.

When the outer peripheral edge of the disc spring 11a is placed on a horizontal surface so as to be in contact with the horizontal surface, the disc spring 11a is formed in such a manner that the inner peripheral side of the disc spring 11a is higher than the horizontal plane. In other words, the annular peripheral surface of this disc spring 11a is formed into a tapered surface. Although the two disc springs 11a and 11b have the same shape, the two disc springs 11a and 11b are disposed on the upper surface of the compressor cover 7 so that the outer peripheral surfaces of the two disc springs 11a and 11b are in contact with each other.

The adapter 12 is disposed on the two disc springs 11a and 11b.

The adapter 12 is formed in substantially the shape of a cylinder. A ball 13 is situated within the outer surface of the adapter 12, and the ball 13 is situated within the outer surface of the adapter 12 in such a way that a portion of the ball 13 is in contact with the inner surface of the bonnet case 6. The hall 13 prevents the adapter 12 from rattling in the bonnet case 6; moreover, in order to enable the adapter 12 to move smoothly in the axial direction within the bonnet case 6 by means of the ball 13, the adapter 12 is secured in the bonnet case 6. The adapter 12 is an example of the rotating portion support member in the present invention and is a part of the actuator in the present invention.

A portion of a stem 14 is inserted into the open, upper portion of the adapter 12.

A stem head 15 is mounted on the upper portion of the stem 14. The combination of the stem 14, stem head 15, and the adapter 12 forms an example of the actuator embodied in the present invention. The invention is not limited to the combination of the stem 14, the stem head 15, and the adapter 12. Various configurations or structures can be adopted as long as the valve is being displaced between a closed position and an open position when the operating portion is operated.

The stem 14 has a large-diameter portion 14a whose outside surface is generally cylindrical in shape and the large-diameter portion 14a is integrally formed such that there is a step created at one end of the large-diameter portion 14a with a medium-diameter portion 14b having a diameter smaller than that of the large-diameter portion 14a and whose outside surface is also generally cylindrical in shape; further, the medium-diameter portion 14b is integrally formed such that at the other end of the medium-diameter portion 14b another step is created with a small diameter portion 14c having a diameter smaller than that of the medium diameter portion 14b and whose outside surface is generally cylindrical in shape.

The large-diameter portion 14a is inserted into the open, upper portion of the adapter 12. The outer surface of the large-diameter portion 14a is arranged such that the outer surface of the large diameter portion 14a is able to slide along and in communication with the inner surface of the adapter 12. As further described later, the stem 14 is able to exhibit rotational motion in the axial direction but does not exhibit translational motion in the axial direction.

A guide groove 12a having an elongated hole penetrating from the inner surface of the adapter 12 to the outer surface is formed obliquely on the peripheral side surface of the adapter 12. Moreover, there are two guide grooves formed on the peripheral side surface of the adapter 12.

Figure 2:
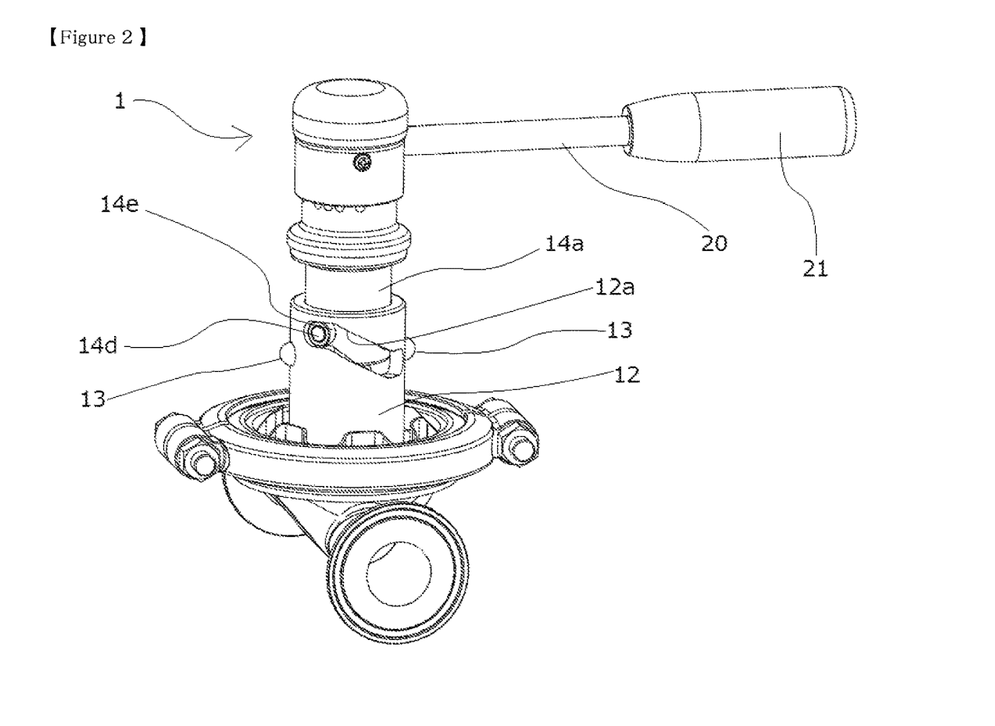
FIG. 2 is a perspective view of an example of the present invention showing a state in which the bonnet case has been removed from the valve device.

Further, as shown in FIG. 2, a protruding portion 14d is formed on the outer surface of the large diameter portion 14a so as to protrude from the outer surface and a rotating ring 14e is arranged around the outer surface of the protruding portion 14d and is able to rotate around the protruding portion 14d. Consequently, the rotating ring 14e is able to rotatably move within the guide groove 12a. In other words, when the stein 14 is rotated about its axis, the large diameter portion 14a also rotates causing the protruding portion 14d to move within the guide groove 12a by means of the rotation of the large diameter portion 14a, and as the projecting portion 14d moves within the guide groove 12a, the adapter 12 is moved back and forth in the axial direction. By moving the adapter 12 back and forth in the axial direction, the compressor cover 7 and compressor 8 are also moved back and forth; this back and forth motion also causes the diaphragm 9, which is operatively connected to the compressor, to move back and forth allowing for the flow path to be opened and closed. Moreover, the rotating ring 14e enables the projecting portion 14d to also move smoothly within the guide groove. Here the movement of the adapter 12 is described as back and forth; however, depending on the direction in which the adapter is arranged, the movement can also be described as "backward and forward" or "up and down".

The projecting portion 14d and the rotating ring 14c form one example of an element for moving the valve in the present embodiment.

Further, as shown in FIG. 1, a coil spring mounting portion 14f is formed within the large diameter portion 14a of the stem 14 so as to form a substantially cylindrical space. A coil spring 16 is arranged in the coil spring mounting portion 14f. The coil spring 16 is an example of a biasing member in the present invention. The biasing member in the present invention is not limited to a coil spring 16. Various modifications such as elastic rubber or leaf springs can also be used as the biasing member so long as the biasing member applies a biasing force enabling the valve to alternate between an open position and a closed position.

The coil spring 16 applies a force on the diaphragm 9.

Furthermore, the bonnet sleeve 17 has an inner step 17a and a through hole 17b.

The medium diameter portion 14b of the stem 14, which is formed above the large diameter portion 14a forming a step between the medium diameter portion and the large diameter portion, is inserted through the through hole 17b of the bonnet sleeve 17.

A male thread is formed on the outer surface of the medium diameter portion 14b of the stem 14. The male thread of the medium diameter portion 14b is screwed into a female thread which is formed on the inner surface of a sleeve socket 18. The sleeve socket 18 is arranged between the through hole 17b of the bonnet sleeve 17 and the male screw formed surface of the middle diameter portion 14b. A lock nut 19, loosely fitted around the medium diameter portion 14b of the stem 14, is disposed of on the upper surface of the sleeve socket 18.

In addition, a male thread is formed on the outer surface of the lock nut 19 and a female thread is formed on the inner surface of the bonnet sleeve 17. When the medium diameter portion 14b is inserted through the central opening of the lock nut 19 and screwed in, the male thread of the lock nut 19 and the female thread of the bonnet sleeve 17 are also screwed together. The lower end surface of the sleeve socket 18 is in contact with the step 17a which prevents the sleeve socket 18 from moving downward. Also, a jig hole (not shown) is formed on the upper surface of the sleeve socket 18 which allows for the sleeve socket 18 to be rotated by inserting an appropriate jig into the jig hole before screwing together the lock nut 19 and the bonnet sleeve 17. When the sleeve socket 18 is rotated, the lower end surface of the sleeve socket 18 is restricted in its displacement by the step 17a, so that as the sleeve socket 18 rotates, the medium diameter portion 14b of the stem 14 moves along the axial direction. Because the female thread of the sleeve socket 18 and the male thread of the medium diameter portion 14b are screwed together, even if a force along the axial direction is exerted on the stem 14, for example, a force to raise the stem 14 along the axial direction, the stem 14 will not easily be displaced on account of the frictional force between the female thread and the male thread. After the sleeve socket 18 is screwed into the medium diameter portion 14 b of the stem 14, the lock nut 19 is screwed into the bonnet sleeve 17 so that the sleeve socket 18 does not loosen.

The sleeve socket 18 is screwed together with the male screw of the medium diameter portion 14b of the stem 14. Thus the sleeve socket is screwed together with the stem 14, i.e. the actuator, and provides an example of the threaded member in the present invention.

A stem head 15 is attached to part of the medium diameter portion 14b and the small diameter portion 14c of the stem 14.

The stem head 15 is fixed to the small diameter portion 14c. Therefore, when the stem 14 is rotated about its center axis, the stem head 15 also rotates in the same manner as the rotating small diameter portion 14c. The stem 14 and the stem head 15 are examples of the rotating portion in the present invention. Various modifications can be made to the configuration and construction of the rotating part in the present invention as long as the rotating part is able to be rotated by the operating portion.

The diameter of the outer circumferential surface of the upper end portion of the bonnet sleeve 17 and the diameter of the outer circumferential surface of the stem head 15 are designed to be the same. Accordingly, when the bonnet sleeve 17 and the stem head 15 are laid on top of each other in a manner such that their center axes are the same, i.e. they are stacked, the outer surface of the upper end portion of the bonnet sleeve 17 and the outer surface of the stem head 15 are uniformly aligned with one another. The reason for designing the bonnet sleeve 17 and the stem head 15 in a manner such that when the bonnet sleeve 17 and the stem head 15 are stacked so the center axes are aligned and the outer surface of the upper portion of the bonnet sleeve 17 and the outer surface of the stem head 15 are aligned is because this configuration is convenient for forming a locking device which is described later. As seen in FIG. 1, the bottom surface of the stem head 15 and the top surface of the bonnet sleeve 17 are arranged such that they are facing each other and are in close proximity to each other.

An elongated rod-shaped lever 20 is attached to the side surface of the stem head 15 in such a manner that the lever 20 extends substantially perpendicularly from the center axis of the stem 14 and has a grip 21 attached to the opposite end of the lever from where the lever is attached to the stem. The lever 20 is integrally coupled to the stem head 15 by screwing a male thread formed at the end of the lever into a female threaded mounting hole formed on the surface of the stem head 15. The more specific details of the stem head 15 are described later.

An example of the operating portion in the present invention is formed by a lever 20 and a grip 21, wherein when the operating portion including the lever 20 and the grip 21 is rotated, the stein 14 moves along the axial direction displacing the valve's diaphragm 9 between the closed position and the open position. The operating portion in the present invention is not limited to the combination of a lever 20 and a grip 21 as long as the operating portion is able to displace the valve body between the closed position and the open position by driving the actuator. While in the present embodiment the back and forth displacement of the valve body is realized via the conversion of a rotational motion of the lever 20 and the grip 21, the operating portion may also have a configuration or construction that utilizes a back and forth motion in order to displace the valve back and forth. In the case where the operating portion utilizes a rotational motion, a mechanism or structure for converting the rotational motion into a back and forth motion, such as a structure combining a rack and a pinion or a structure incorporating a bevel gear, etc. can be employed.

In addition, the valve device 1 is provided with a locking device. The locking device has the same configuration as that of the locking device described in Japanese Patent Application Laid-Open No. 2014-211170 but is also described below.

Figure 3:
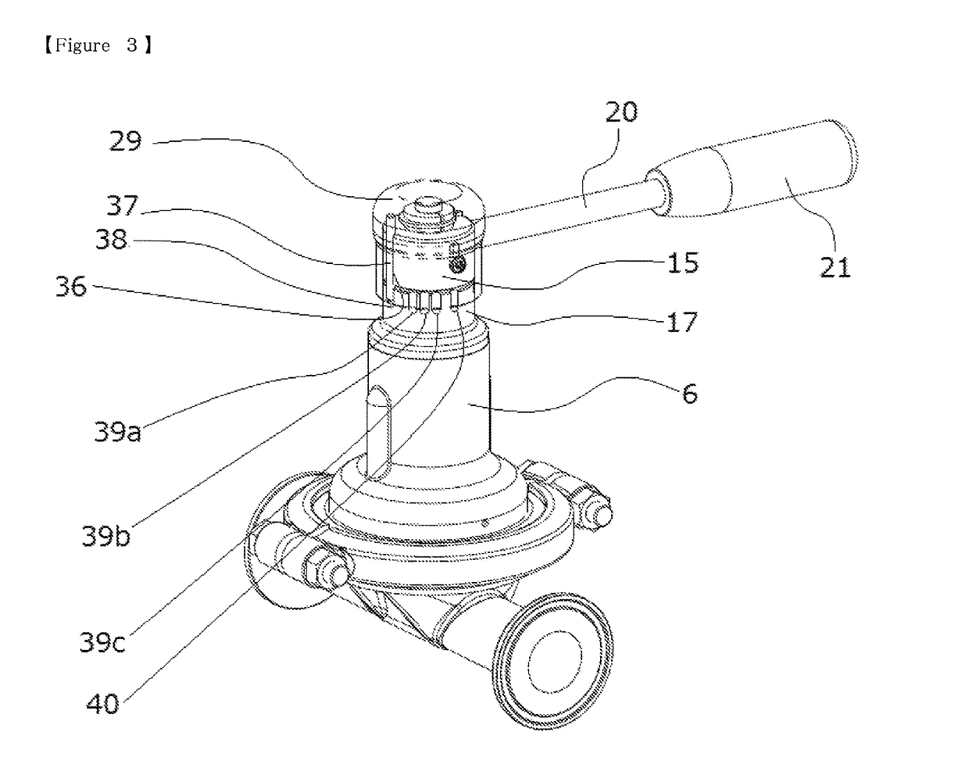
FIG. 3 is a perspective view of an example of the present invention showing a state in which the open-bottomed cylindrical body of the locking device of the valve device is removed but the pin forming a protruding portion remains.

As shown in FIG. 1, FIG. 2, and FIG. 3, the locking device has a generally tubular body which can be round or multi-sided, e.g. a cylindrical body, and in this embodiment in particular an open-bottomed cylindrical body 29, which is mounted in a manner so as to be able to move back and forth along the central axis of the stem head 15 which is a part of the actuator.

In the example shown in the drawings, the open-bottomed cylindrical body 29 has a generally cylindrical shape that is open at one end and closed at the other end.

Figure 4:
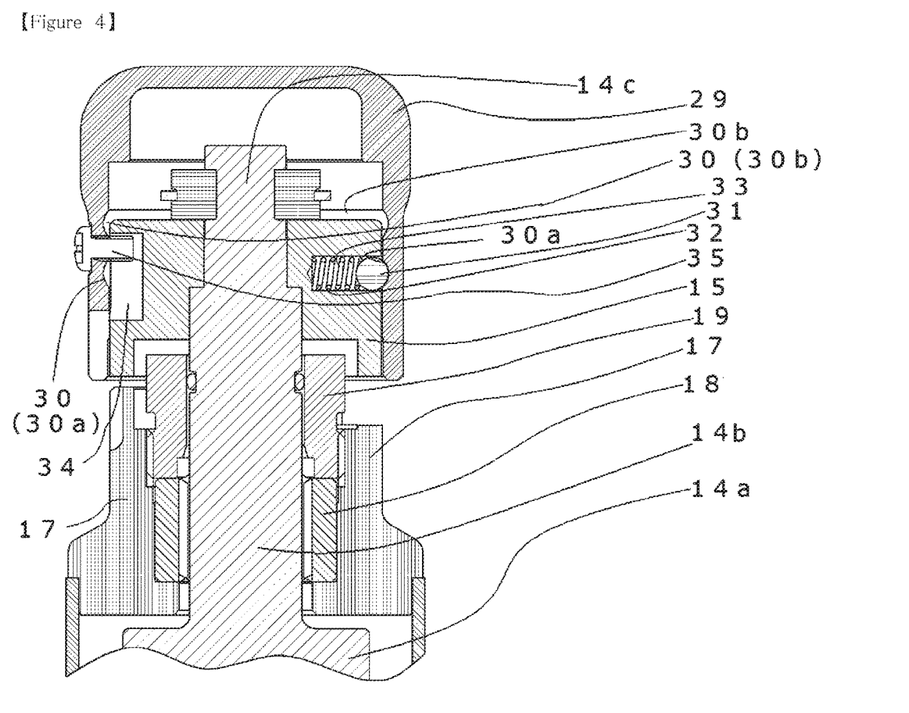
FIG. 4 is a cross-sectional view of an example of the present invention in which the open-bottomed cylindrical body has been moved in such a way that the bonnet sleeve is exposed.
Figure 5:
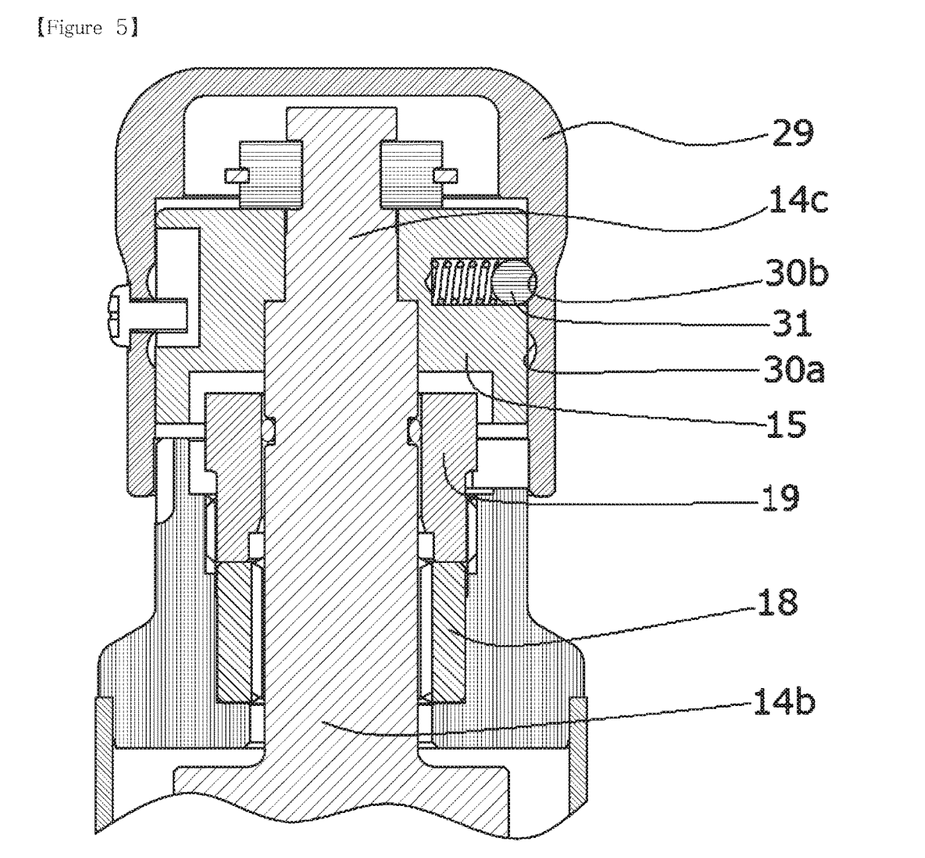
FIG. 5 is a cross-sectional view of an example of the present invention showing a state in which the open-bottomed cylindrical body has been moved in such a way that the bonnet sleeve is covered by the open-bottomed cylindrical body.

As shown in FIGS. 4 and 5, the diameter of the inner surface of the open-bottomed cylindrical body 29, i.e. the inner diameter, is determined so that the stem head 15 and the bonnet sleeve 17 can be smoothly inserted into the open end. On the inner surface of the open-bottomed cylindrical body 29 are two engagement recesses 30, an upper recess and a lower recess, which are annularly formed so as to circumnavigate around the central axis on the inner surface of the open-bottomed cylindrical body 29. Of the two upper and lower engagement recesses 30, the engagement recess 30 formed at the position close to the open end of the open-bottomed cylindrical body 29 is the lower recess 30a, and the engagement recess 30 formed at the position close to the closed end of the open-bottomed cylindrical body 29 is the upper recess 30b. In a cross-sectional view of the shared central axis of the open-bottomed cylindrical body 29, the lower recess 30a and the upper recess 30b form an arc shape. Since the cross section of the engagement recess 30 is formed in a generally circular arc shape, the engagement ball 31, described later, is able to be engaged with the engagement recess 30 without rattling. The location for where to create the lower recess 30a and the upper recess 30b are able to be appropriately determined based on the mounting position of the locking ball 31. In the case where the locking ball 31 is engaged with the lower recess 30a, the open-bottomed cylindrical body 29 does not cover the outer surface of the bonnet sleeve 17; however, in the case where the locking ball 31 is engaged with the upper recess 30b, the open-bottomed cylindrical body 29 covers the outer surface of the bonnet sleeve 17.

As shown in FIGS. 4 and 5, a biasing member such as a small coil spring 33 and a locking ball 31 biased by the small coil spring 33 are loaded in a hole 32 formed in the radial direction of the stein head 15 and in the outer surface of the stem head 15. As the open-bottomed cylindrical body 29 moves along the central axis of the stem head 15, when the locking ball 31 is biased towards the upper recess 30b or the lower recess 30a, the locking ball 31 is fitted into the upper recess 30b or the lower recess 30a, respectively, by the biasing force of the small coil spring 33; further, when the locking ball 31 is biased towards the inner surface of the open-bottomed cylindrical body 29 and is disposed between either the upper recess 30b or the lower recess 30a, the locking ball 31 is partially disposed in the hole 32 counteracting the biasing force of the small coil spring 33. That is, the locking ball 31 is provided in such a manner on the outer surface of the stem head 15 so that it can protrude and retract.

Therefore, when the open-bottomed cylindrical body 29 is moved along the central axis away from stem head 15 and towards the bonnet sleeve 17, the locking ball 31 which was originally in the lower recess 30a smoothly rolls along the inner surface of the open-bottomed cylindrical body 29 from the lower recess 30a to the upper recess 30b and thereafter, the locking ball 31 clicks into the upper recess 30b. Alternatively, when the open-bottomed cylindrical body 29 is moved along the central axis away from the bonnet sleeve 17 and towards the stem head 15, the locking ball 31 which was originally in the upper recess 30b smoothly rolls along the inner surface of the open-bottomed cylindrical body 29 from the upper recess 30b to the lower recess 30a, and thereafter, the locking ball 31 clicks into the lower recess 30a. Consequently, a person operating the device is able to reliably distinguish when the open-bottomed cylindrical body 29 is in the predetermined position based on the tactile sensation of the operating hand.

Also, as shown in FIG. 4, an elongated longitudinal groove 34 has been formed on the outer peripheral surface of the stem head 15, and in the groove 34 the tip portion of a bolt 35 is screwed into a screw hole which has been penetratingly formed and fitted in the outer surface of the open-bottomed cylindrical body 29. Furthermore, the combination of the groove 34 and the bolt 35 prevents the open-bottomed cylindrical body 29 from slipping off of the stem head 15, and also prevents the open-bottomed cylindrical body 29 from covering the bonnet sleeve 17 more than necessary.

As shown in FIG. 3, a pin mounting groove 36 is formed on the inner surface and in a direction parallel to the central axis of the open-bottomed cylindrical body 29. The pin mounting groove 36 is formed in a semicircular shape in a cross sectional view from the direction perpendicular to the center axis of the open-bottomed cylindrical body 29. A pin 37 is fitted into the pin mounting groove 36. Accordingly, in a cross sectional view with respect to the perpendicular axis of the pin 37, a semicircular portion of the pin 37 is fitted in the pin mounting groove 36, the remaining semicircular portion of the pin 37 is in a state of protruding from the inner surface of the cylindrical body 29, and the portion of the pin 37 protruding from the inner peripheral surface of the cylindrical body 29 is the convex portion in the present invention.

FIG. 3 also shows five longitudinal grooves 38, 39a, 39b, 39c, 40 formed parallel to the central axis of the bonnet sleeve 17 on the outer surface of the bonnet sleeve 17. All of these five longitudinal grooves 38, 39a, 39b, 39c, and 40 have substantially the same shape. Representing the five longitudinal grooves 38, 39a, 39b, 39c, 40, the longitudinal groove 38 will be used; the longitudinal groove 38 is formed on one side of the bonnet sleeve 17, i.e. the opposite surface from the surface of the stem head 15; the groove is formed in the outer surface of the bonnet sleeve 17 so that the groove is parallel with the central axis of the bonnet sleeve 17 and has a predetermined length. Any length for the longitudinal groove 38 can be used so long as the protruding portion of the pin 37 provided on the inner surface of the bottomed cylindrical body 29 is able to be inserted when the cylindrical body 29 is in a state covering the bonnet sleeve 17.

Of the five longitudinal grooves 38, 39a, 39b, 39c and 40 arranged alongside each other, the position of the longitudinal groove 38 is determined so as to correspond to a state in which the diaphragm 9 in the valve device 1 is completely blocking the flow path. Usually, the formation position of the longitudinal groove 38 is determined so as to allow the pin 37 to fit into the longitudinal groove 38 when the lever 20 extends in a direction perpendicular to the linear fluid flow path which includes the fluid inflow passage 2 and the fluid outflow passage 3. The state in which the valve body is completely blocking the flow path can be determined based on the position of the longitudinal groove 38. Therefore, the longitudinal groove 38 is the first longitudinal groove in the present embodiment.

Of the five longitudinal grooves 38, 39a, 39b, 39c, and 40 arranged alongside each other, the position of the longitudinal groove 40 is determined so that the diaphragm 9 in the valve device 1 corresponds to a state in which the flow path is completely open. Usually, the formation position of the longitudinal groove 40 is determined so as to allow the pin 37 to fit into the longitudinal groove 40 when the lever 20 extends in a direction parallel to the linear fluid flow path which includes the fluid inflow passage 2 and the fluid outflow passage 3. The state in which the valve body is completely open to the flow passage can be determined based on the position of the longitudinal groove 40. Therefore, the longitudinal groove 40 is the second longitudinal groove in the present invention.

Of the five longitudinal grooves 38, 39a, 39b, 39c, and 40 arranged alongside each other, the positions of the three longitudinal grooves 39a, 39b, 39c are determined so that the valve body is in varying intermediate stages between the completely closed state and the completely opened state.

The valve device 1 as described above operates as follows.

As shown in FIG. 4, initially, the open-bottomed cylindrical body 29 is housing the stem head 15, but the outer surface of the bonnet sleeve 17 is not covered by the open-bottomed cylindrical body 29. In this initial stage, the adapter 12 is also in a state of being pulled down by the large diameter portion 14a of the stem 14 which causes the diaphragm 9 to completely block the fluid flow path in the valve device 1. In other words, the diaphragm 9 is in the closed position.

To change the state of the diaphragm 9 from the closed state to the Bully open state, the following operation is performed.

As shown in FIGS. 1 to 3, a force is applied to the grip 21 by a hand rotating the lever 20 counterclockwise.

Simultaneously with the rotation of the lever 20, the stem head 15 and the stem 14 also rotate counterclockwise. However, the bonnet sleeve 17 does not rotate. Along with the rotation of the stem 14, the large diameter portion 14a also rotates counterclockwise. When the large diameter portion 14a rotates, the projecting portion 14d also rotates at the same time. Because the projecting portion 14d is fitted into the guide groove 12a and the projecting portion 14d rotates within the plane perpendicular to the central axis of the large diameter portion 14a, the adapter 12 ascends along the adapter's 12 central axis as the projecting portion 14d rotates. However, even when the adapter 12 begins to ascend, the adapter 12 does not rotate.

As the lever 20 continues to be rotated, the large-diameter portion 14a also rotates, and the adapter 12 continues to ascend as the large-diameter portion 14a rotates. When the lever 20 is in a position where the longitudinal direction of the lever 20 and the direction of the fluid flow path coincide, the adapter 12 is in a state of being fully ascended. When the adapter 12 is in a state of being fully ascended, the diaphragm 9 is in a state in which the fluid flow path is completely opened, i.e. in a fully opened state.

When the diaphragm 9 is displaced from the closed state to the fully opened state, because the coil spring 16 biases the diaphragm 9 in a biasing direction, rotation of the lever 20 requires a non-trivial force which opposes the biasing force of the coil spring 16 and the biasing force of the disc springs 11a and 11b. Therefore, the lever 20 does not easily over-rotate and is able to be operated using a slow motion.

Because the lever 20 is able to be rotated by means of a slow motion, the operator is able to meticulously turn the lever 20.

In order to fix and maintain this fully open state, the open-bottomed cylindrical body 29 is lowered. When the open-bottomed cylindrical body 29 is lowered, the locking ball 31 which was originally fitted into the lower recess 30*a* disengages from the lower recess 30*a*; consequently, the locking ball 31 moves into the hole 32 by counteracting the biasing force of the small coil spring 33. When the open-bottomed cylindrical body 29 continues to be further lowered, the locking ball 31 moves to the upper concave portion 30*b* by rolling along the inner peripheral surface of the open-bottomed cylindrical body 29. As the locking ball 31 moves into the upper concave portion 30*b* due to the downward motion of the open-bottomed cylindrical body 29, the locking ball 31 is pushed into the upper recessed portion 30*b* by the biasing force of the small coil spring 33. Because the open-bottomed cylindrical body 29 is manually moved, the operator is able to feel a slight resistance when the locking ball 31 is pushed into the upper recessed portion 30*b*. Accordingly, the operator would discontinue further displacing the open-bottomed cylindrical body 29.

When the locking ball 31 is fitted in the upper concave portion 30*b* of the open-bottomed cylindrical body 29, the pin 37 is engaged in the second vertical groove 40.

Therefore, because the bonnet sleeve 17 and the stem head 15 are fixed so as not to be rotatable and are coupled together by the pin 37, the actuator consisting of the stem head 15 and the stem 14 becomes non-rotatable.

If the open-bottomed cylindrical body 29 is not moved toward the bonnet sleeve 17 and the outer surface of the bonnet sleeve 17 is exposed, then because the actuator is not locked in an unrotatable manner, when the pressure of the fluid in the fluid flow path decreases, or when the lever 20 is rotated in the clockwise direction by an external force, the rotation of the actuator displaces the diaphragm 9 changing the flow state from a fully open state to a partially open state in accordance with the rotation angle.

However, if the actuator is locked by the open-bottomed cylindrical body 29, then regardless of whether the fluid pressure in the fluid flow path changes or an external force trying to rotate the lever 20 is applied in a clockwise direction, the position of the diaphragm 9 will remain unchanged, and the completely open state of the diaphragm 9 is fixed and maintained.

Next, the manner in which the position of the valve is changed from the completely open state by the diaphragm 9 to a partially open state instead of from the completely closed state is as follows.

The open-bottomed cylindrical body 29, which starts in a state in which the outer surface of the bonnet sleeve 17 is covered and the pin 37 is fitted into the second longitudinal groove 40, is pulled upward along the central axis of the open-bottomed cylindrical body 29. The open-bottomed cylindrical body 29 is pulled up until the locking ball 31, which was fitted in the upper recess 30*b* formed on the inner surface of the open-bottomed cylindrical body 29, becomes fitted in the lower recess 30*a*. By doing this, as the connection between the pin 37 and the second longitudinal groove 40 is eliminated, the actuator, which includes the stem head 15 and the stein 14, becomes rotatable with respect to the bonnet sleeve 17.

Accordingly, by turning the lever 20 in the clockwise direction, the actuator is rotated. As the actuator is rotated, the projecting portion 14*d*, to which the rotary ring 14*e* is coupled, moves within the guide groove 12*a*; thus, as the projecting portion 14 *d* moves, the adapter 12 is made to descend along the central axis thereof causing the diaphragm 9 to also descend due to the downward movement of the adapter 12. As the diaphragm 9 descends, the diaphragm 9 causes the fluid flow path to gradually change from a completely open state to a partially open state. That is, the diaphragm 9 changes from the completely open position to a partially open position for the diaphragm 9.

After ceasing to rotate the lever 20 and lower the open-bottomed cylindrical body 29 along the central axis thereof, the pin 37 will be fitted into, for example, the longitudinal groove 39*a*. Once the cylindrical body 29 has been completely lowered, the pin 37 has been completely fitted into the vertical groove 39*a*. As a result, the stem head 15 has become integrally coupled with the bonnet sleeve 17 and becomes unrotatable.

As described earlier, when the actuator including the stem head 15 is in a non-rotatable state, even if there is a change in the fluid pressure in the flow path or an external force is exerted on the lever 20 by rotating the lever 20 in either a clockwise or counterclockwise direction, the actuator cannot rotate; and therefore, the position of the diaphragm 9 remains unchanged and the fluid flow state as determined by the diaphragm 9 position will remain unchanged. Moreover, because of the biasing forces from the coil spring 16 and the disc springs 11*a*, 11*b*, as well as the frictional force in the threading of the screwed sleeve socket 18 which is the threaded member, even if the fluid pressure suddenly increases, the stem 14 and the stem head 15 will not be pushed upward, thus minimizing any fluid leakage in the flow path.

As described above, because the position of the valve can be fixed by fitting the protruding portion of the open-bottomed cylindrical body 29 into one of the longitudinal grooves provided in the actuator support member, the position of the valve will remain unchanged regardless of whether there is a pressure change due to an increase in the fluid pressure in the flow path or an external force is applied causing the actuator to rotate.

Moreover, due to the presence of the threaded member, a biasing members such as the coil spring, as well as the disc springs, even if a sudden rise in the fluid pressure in the fluid flow path occurs while the actuator is being driven, any sudden and unexpected movements are prevented if that the actuator disengages from the valve. Further, because of the inclusion of the threaded member, operability is improved in terms of the prevention of erroneous operation, and more specifically, because of the threaded member, the biasing member, and the disc springs, the operating portion is able to be operated slowly and this simple and light operation prevents of erroneous operation of the operating portion.

LEGEND OF KEY TERMS

1 Valve Device
2 Inflow Path
3 Outflow Path
4 Valve Body
5 Support Member
6 Bonnet Case
7 Compressor Cover
8 Compressor
9 Diaphragm
9*a* Backup Elastic Membrane
10 Joint
11*a* Disk spring
11*b* Disk spring
12 Adapter 12a Guide Groove
13 Ball
14 Stem
14a Large Diameter Portion
14b Medium Diameter Portion
14c Small Diameter Portion
14d Projecting Portion
14e Rotating Ring
14f Coil Spring Mounting Part
15 Stem Head
16 Coil Spring
17 Bonnet Sleeve
17a Step
17b Opening
18 Sleeve Socket
19 Lock Nut
20 Lever
21 Grip
29 Open-Bottomed Cylindrical Body
30 Engagement Recess
30a Lower Recess
30b Upper Recess
31 Locking Ball
32 Hole
33 Small Coil Spring
34 Groove
35 Bolt
36 Pin Insertion Groove/Pin Mounting Groove
37 Pin
38 Longitudinal Groove
39a Longitudinal Groove
39b Longitudinal Groove
39c Longitudinal Groove
40 Longitudinal Groove

What is claimed:

1. A valve device comprising:
a valve,
an operating portion,
an actuator,
an actuator support member, and
a threaded member;
wherein the valve is able to open and close a fluid path in a valve body having a fluid inflow passage and a fluid outflow passage,
wherein the operating portion drives the actuator,
wherein the actuator contains a rotating portion which is able to rotate in response to operation of the operating portion and has a male thread formed on an outer peripheral surface thereof, a rotating support member that holds the rotating portion and converts the rotational displacement of the rotating portion into a linear back-and-forth displacement of the valve, wherein the converted linear back-and-forth displacement is transmitted to the valve to displace the valve between an open position and a closed position,
wherein the threaded member is provided with a female thread on an inner peripheral surface thereof such that the female thread is threadedly engaged with the male thread of the rotating portion, and
wherein the actuator support member has a step which is in contact with one end of the threaded member in an axial direction, and wherein a lock nut is arranged at an opposite end of the threaded member in the axial direction, thereby supporting the threaded member in such a manner that the threaded member is arranged in the actuator support member and is immovable in the axial direction of the rotating portion.

2. The valve device according to claim 1, wherein the valve includes a diaphragm.

3. The valve device according to claim 1, further comprising a biasing member which is disposed between the rotating portion and the valve and biases the valve in a direction from the open position of the valve to the closed position.

4. The valve device according to claim 3, wherein the biasing member is a coil spring.

5. The valve device according to claim 4, wherein a disc spring is interposed between the rotating support member and the valve.

6. The valve device according to claim 5, wherein the step of the actuator support member is in contact with one end of the threaded member which is disposed closer to the valve.

7. The valve device according to claim 6, wherein the actuator support member is provided with a female thread on an inner peripheral surface thereof, and
wherein the lock nut is provided with a male thread on an outer peripheral surface thereof such that the male thread of the lock nut is threadedly engaged with the female thread of the actuator support member.

8. The valve device according to claim 7, wherein the rotating portion has a first cylindrical portion with a first diameter, and
wherein the lock nut, the threaded member and the actuator support member are arranged outside the first cylindrical portion.

9. The valve device according to claim 3, wherein a disc spring is interposed between the rotating support member and the valve.

10. The valve device according to claim 1, wherein a disc spring is interposed between the rotating support member and the valve.

11. The valve device according to claim 1, further comprising a compressor configured to transmit the converted linear back-and-forth displacement to the valve to displace the valve between the open position and the closed position.

* * * * *